United States Patent [19]

Connery

[11] Patent Number: 4,801,436

[45] Date of Patent: Jan. 31, 1989

[54] CRYSTALLIZING APPARATUS

[75] Inventor: Colin A. Connery, Mt. Vernon, N.Y.

[73] Assignee: Living Water Corporation, Mt. Vernon, N.Y.

[21] Appl. No.: 943,792

[22] Filed: Dec. 19, 1986

[51] Int. Cl.$^4$ .......................... B01D 9/00; B01D 9/02
[52] U.S. Cl. ........................................ 422/245; 62/66; 62/67; 422/246; 422/248; 422/252
[58] Field of Search ..................... 62/66, 67; 422/245, 422/252, 246, 248

[56] References Cited

U.S. PATENT DOCUMENTS

| 3,137,544 | 6/1964 | Ebner | 422/252 |
| 3,996,018 | 12/1976 | Midler, Jr. | 422/252 |
| 4,291,550 | 9/1981 | Engdahl et al. | 422/245 |
| 4,318,772 | 3/1982 | Kragh | 422/245 |

FOREIGN PATENT DOCUMENTS

| 2653049 | 5/1978 | Fed. Rep. of Germany | 422/245 |
| 396116 | 5/1971 | U.S.S.R. | 422/252 |
| 453165 | 2/1973 | U.S.S.R. | 422/252 |
| 747487 | 6/1980 | U.S.S.R. | 422/252 |
| 942784 | 7/1982 | U.S.S.R. | 422/245 |

Primary Examiner—Asok Pal
Attorney, Agent, or Firm—Clement and Ryan

[57] ABSTRACT

An apparatus for growing free-floating, buoyant crystals to a predetermined size. Crystals having a positive buoyancy such as water crystals (ice) grow due to immersion in a stream of supercooled feed water that flows downward in a tapered incubation duct with a velocity that decreases as the cross-sectional area of the duct increases with increased depth. As the crystals grow, their terminal buoyant velocity increases until it exceeds the peak stream velocity. At this time the crystals float upward and out of the apparatus. A plurality of interconnected incubation ducts may be stacked vertically one above the other. The apparatus may be combined with apparatus to grow free-floating crystals having a negative buoyancy from a supersaturated salt solution that is discharged from the bottom of the apparatus for growing crystals having a positive buoyancy.

11 Claims, 2 Drawing Sheets

CRYSTALLIZING APPARATUS

FIELD OF THE INVENTION

This invention relates to an apparatus for growing free-floating, buoyant crystals to a predetermined size.

BACKGROUND OF THE INVENTION

There is a variety of situations where it is desirable to generate ice pieces having uniform predetermined physical characteristics. For example, the size and shape of a piece of ice will determine its melt rate and handling properties.

A less familiar but economically important concern arises in connection with the ice cycle water distillation process, where that property of the ice crystal lattice that enables it to exclude foreign matter is exploited to distill fresh water from brine or otherwise polluted water. In any such case, it is essential to grow crystals that are free of brine-entraining flaws and are large enough to reduce the problem of clinging brine to manageable proportions.

The common method for controlling the physical shape and size of ice pieces is to grow them in molds for example, or on solid surfaces from which ice sheets are removed and broken up. These methods are satisfactory for small volume applications where cost and complexity are not major concerns, and where pure feed water is available or where purity is not an important consideration.

In the case of an ice crystal water distillation apparatus, these solid surface cooling processes are typically too expensive. In addition, the uneven heterogeneous crystal seeding and ice growth process is not well suited to the task of creating flaw free crystals.

An alternative approach for generating ice involves the "non-contact" processes. One example is the flash freezing process, where water at its freezing temperature is made to boil at a suitably low vapor pressure. This results in the formation of free floating ice crystals that are chemically pure. However, these crystals are varied in size and typically very small. The problem is that the homogeneous seeding and crystallization process is difficult to initiate and control.

For reasons similar to those noted above in connection with ice, there are many other chemicals from which it is desirable to grow large crystals that are free of flaws.

SUMMARY OF THE INVENTION

My invention is an apparatus for growing, in a rapid and energy efficient manner, free-floating crystals that are closely matched with respect to size. The crystals are produced by freezing from a supercooled liquid, and are grown to a size that exhibits a predetermined positive terminal buoyant velocity, which produces the close size match just mentioned.

When water is cooled to its freezing temperature, or even below, it does not always freeze immediately. Under certain conditions, as its temperature is lowered to the freezing point and below, the water will become——and remain—"supercooled" until conditions arise which cause a seed crystal to form. Once the seed crystal exists in its smallest form, it can grow rapidly. In the absence of a suitable heterogeneous seeding surface, such as a duct wall or solid impurity suspended within the body of water, the water temperature may drop many degrees Celsius before homogeneous crystallization initiates the freezing process.

In my apparatus, I propose to take advantage of this delay in the onset of freezing as a means of separating the water chilling process (in a water chiller) from the ice forming process (in an incubation duct). This permits an optimized crystallization process, without the need to address the problems that arise when ice forms upon the cooling surfaces.

To accomplish this end I draw upon the well known fact that glass and many plastics, because of their amorphous and non-polar character, provide very poor heterogeneous seeding surfaces. I propose that a water chilling apparatus be constructed in which the water to be chilled comes in contact only with glass or other non-seeding surfaces.

Water passing through this chiller will be supercooled to a temperature below its freezing temperature. It is desirable that the flow path of the water through the apparatus be divided up among as many physically separate ducts as is practical. This, of course, will increase the surface area through which heat exchange may occur, which result is very useful. But more important is the role that the isolated ducts play in limiting the scope of any crystallization event that occurs when a seed crystal is inadvertently formed within a cooling duct.

Several factors influence how deeply the water should be supercooled. From a thermodynamic point of view the depth of supercooling should be minimized, as this will more closely approximate an efficient isothermal freezing process. Also, the growth of crystals free of brine-entraining flaws is favored by shallow subcooling. On the other hand, the rate of freezing increases with the depth of supercooling, so that the final choice for this variable is in the nature of a compromise between these competing requirements.

The amorphous character of the water chiller duct walls is also useful in preventing the blockage of the ducts. When crystallization occurs within a chiller duct it is usually brought about by the presence of a suspended impurity that provides a heterogeneous seeding surface. The size of a crystal formed in this manner is limited by the depth of supercooling and, in the case where there are dissolved salts present in the water, by the local depression of the freezing point due to an increase in the local concentration of salts.

These limitations prevent any single crystallization event from forming a crystal large enough to block the duct. In general, when a duct does become blocked it is due to a buildup of ice on the walls of the duct. In the case of the non-seeding amorphous wall, ice does not readily adhere. In the rare event that a seed does form on the wall, it will rapidly grow outward into the flowing stream, where the pressure from the flowing water will act to break the crystal loose from the point where it is attached to the wall.

A second element of my invention is an incubator for growing free-floating ice crystals. I begin with the thought that a free-floating crystal might be held stationary and continuously nourished by a supercooled feed water stream emerging from the water chilling apparatus, if the supercooled stream is directed downward at a velocity equal to the upward float or buoyancy velocity of the crystal. Growth in this manner favors the generation of symmetrical, fault-free crystals. My next concern is to devise a mechanism for bringing about this match in velocities.

As a practical matter it is impossible to adjust the velocity of the downwardly moving stream of water to match the many different and changing velocities that will be found within a group of continuously growing ice crystals, which because of that growth have different and changing sizes and as a result have different and changing bouyancies. Instead, in the apparatus of this invention I provide an incubating duct that is vertically tapered so that the velocity of the downwardly directed stream of water within the duct will vary along the vertical axis of the duct due to the duct's varying cross section. At its base the duct is widest. Near the top the duct is most narrow, with a portion of the very top part of the duct desirably being flared outward.

As a result of this construction of the duct, the velocity of the downwardly directed stream of feed water within the duct will decrease (because of the increasing cross-sectional area of the duct) as the distance to the duct base decreases. The stream will have its maximum velocity at the point near the top where the incubation duct is most narrow, and its minimum velocity adjacent the bottom of the duct where the cross-sectional area is greatest.

Small ice crystals formed in, or otherwise introduced into, this duct will be swept downward by the downwardly moving stream of feed water until a level is reached where the decreased downward stream velocity is matched by the upward velocity of the crystals with respect to their environment of a downwardly moving stream of feed liquid. (It will be noted that the velocity of a particular crystal at any given moment of time with respect to the downwardly moving stream of liquid in which it is immersed is the same as the upward velocity it would have if it were floating in a body of feed liquid that was itself moving neither upward nor downward.) From this moment on, the crystals will stop moving downward, and will grow and gradually increase in size.

With an increase in size there will also occur a decrease in the surface-to-mass ratio, which will bring about an increase in the upward terminal velocity of the crystal with respect to the downwardly moving stream of liquid in which it is immersed. As this terminal velocity increases, the crystal will move to higher levels, where a matching downward water velocity is found. This process will continue until the crystal reaches the narrow point of the duct near the top, where the stream of feed water is moving downward at its greatest velocity. The upward terminal velocity of the crystals is now sufficient for it to escape from the incubator.

It is therefore a valuable and inherent property of a crystallizing duct in accordance with my invention that it will release ice crystals when they reach a size sufficient to match the escape velocity of the apparatus. It is also convenient that this size can be adjusted simply by varying the rate at which supercooled water flows downward through the duct. As the initial velocity of the downwardly flowing stream of water introduced above the incubation duct neck is increased by increasing the pressure difference between the supercooled feed water thus introduced and the water already in the incubation duct, this will increase the terminal buoyant velocity that each crystal must reach before it can overcome the downward velocity of the water stream, and escape upward. This final terminal buoyant velocity is in turn determined by the size to which the crystal grows.

Any liquid other than water than can be crystallized by chilling can also be crystallized in an apparatus in accordance with my invention. In the case of a crystalline material that has a lower density than its liquid form, the apparatus is essentially identical to the apparatus described above for water.

In the other, more common, case where the crystalline material has a greater density than the liquid form, the natural tendency is for the crystal to sink. As a result, the direction of liquid flow necessary to balance the sinking motion of the crystal is upward.

Reasoning in exactly the same manner as above, we discover that the geometry of the apparatus is an inversion of that appropriate for making ice.

In this case, the tiny crystal starts out at the wide top of the apparatus and sinks as it grows, eventually reaching a terminal sinking velocity equal to the maximum upward liquid flow rate at the narrowest section of the incubation duct. At this point further growth will carry the crystal downward through the narrow section, enabling the crystal to exit the incubation duct at the bottom.

One additional feature that may be desired for an incubation apparatus used with sinking crystals is a crystal collector and means for removing the crystals without having to stop and drain the apparatus. This, of course, is not necessary in the case of floating crystals, which may be skimmed from the top of the liquid in the apparatus while it is in operation.

An alternative to growing crystals by chilling the liquid form of the crystalline material is to use a supersaturated solution in which the material for growing the crystals is the solute. In this case, the supersaturated feed solution enters and passes through the incubation duct in exactly the same manner as described above for the supercooled feed liquid.

The salts present in sea water, as well as the salts present in industrial waste water, have much greater commercial value if they are separated from each other before recycling. It is a valuable feature of my invention that it provides an effective means for presorting the different salts present in a solution. Since the various salts present in a supersaturated solution will tend to crystallize out, at unique temperatures of saturation, preferentially onto crystals of their own kind, the relatively large product crystals of the incubation duct will simplify the final separation process. Also simplifying the final separation process is the fact that salt crystals that vary in specific weight will exhibit a measurable difference in size when they are generated within the same incubation duct.

DESCRIPTION OF THE PREFERRED EMBODIMENTS

Single-Stage Ice Crystallizer

Figure 1:
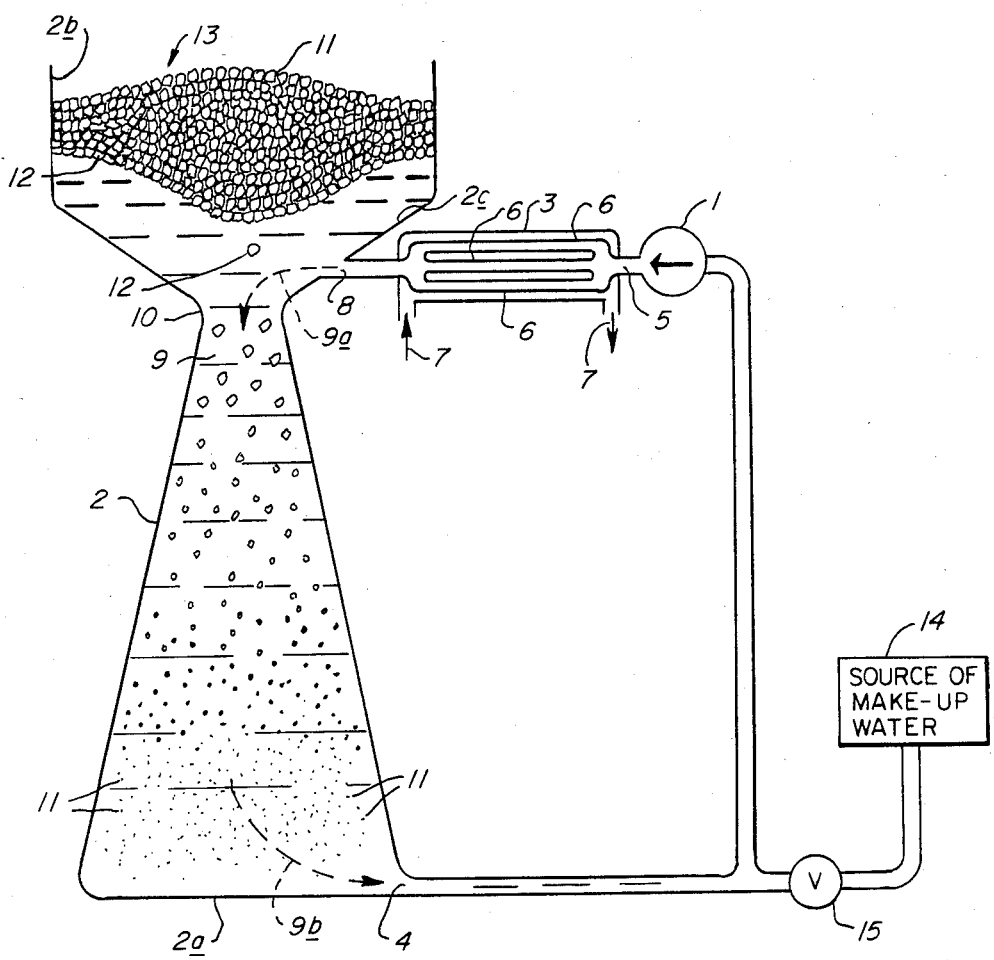
FIG. 1 is a cross-sectional view of a device in accordance with the invention.

In FIG. 1, the device is comprised of three elements: a circulation pump 1, an incubation duct 2, and a water chiller 3.

Circulation pump 1 draws water from outlet drain 4 at the bottom of incubation duct 2, and discharges the water into water chiller 3 at inlet 5, where the stream is partitioned into several substreams by a plurality of chilling ducts 6. Heat is removed from the several substreams of incoming water by indirect cooling from the counter-flow refrigerating stream 7, and the cooled substreams are recombined at the downstream end of water chiller 3.

In the embodiment shown in FIG. 1, vertically oriented incubation duct 2 is tapered inward from adjacent its closed bottom end 2a to its smallest cross-sectional area at neck 10, near its open top end 2b. Duct 2 then flares upward and outward from its narrowest dimension, so that its cross section increases in size for at least a portion 2c of the duct that lies between neck 10 and duct top end 2b. The inward taper of the walls of incubation duct 2 as one moves upward from duct bottom end 2c to duct neck 10 is preferably a monotonic function with respect to the distance above the base of the duct, with the cross-sectional area of the duct either decreasing or remaining the same as the distance from the base increases. For best results the cross-sectional area of the duct decreases, as in FIG. 1, continuously and at a uniform rate with increasing distance from the base.

The cooled water from water chiller 3 is discharged into open flared end 2c of incubation duct 2 at inlet 8. There the chilled water and the water already in the incubation duct merge to form a descending water stream 9, which moves, at a decreasing velocity, down generally along path 9a through duct neck 10, down through incubation duct 2, and then generally along path 9b at the bottom of duct 2. The circuit is completed when the water re-enters circulation pump 1 after exiting from incubation duct 2 through outlet drain 4.

The apparatus may be made self-starting by filling incubation duct 2 with water and setting the sink temperature of refrigerating stream 7 to a temperature sufficiently low to cause spontaneous crystallization within the chilled water circuit.

Initially, the temperature of the water in the circuit will drop until it comes to nearly match the temperature of the refrigerating stream 7. At this reduced temperature spontaneous crystallization occurs, and these very tiny crystals 11 are swept around the chilled water circuit until they have grown to a size 12 adequate to produce an upward terminal float velocity which is equal to the downward velocity of the chilled water stream near base 2a of the incubation duct.

In this manner a clout of tiny, free-floating ice crystals 11 gathers near the bottom of the incubation duct. The largest of the crystals 12 that grow from these tiny crystals 11 will rise to a level within the incubation duct just below duct neck 10, and will therefore be given first access to the supercooled water stream. As water crystallizes onto these leading crystals, the heat of crystallization which is released will raise the local temperature of the water. The water passes downward and is further "sifted" through progressively lower levels of crystals. With a sufficient number of crystals present, essentially all the useful cold will be extracted from the stream.

This mechanism insures that larger crystals, located as they are in the higher levels of incoming chilled water just below neck 10, are favored over smaller crystals in the growth process. As will be seen, the entire height of incubator 2 from wide base 2a to the narrowest level at neck 10 is filled with ice crystals of varying sizes. The crystals illustrated in FIG. 1 show the progression in crystal size as the smallest ice crystals 11 float up within incubation duct 2 and grow in size—through crystallization of water onto those crystals—until they exhibit crystal size 12 and escape farther upward, from neck 10 to outwardly flared top portion 2c of the incubation duct. It will be understood that other tiny crystals (which are omitted for clarity of understanding from FIG. 1) may also be continually recirculating through the loop formed by incubation duct drain outlet 4, recirculation pump 1, water chiller 3, and incubation duct inlet 8.

As already pointed out above, it is preferred that the water that circulates within the loop just mentioned come into contact only with surfaces formed of glass or of a suitable plastic, since the ice crystals will then tend to form only within the body of water itself and not upon the solid surfaces of the various components of the loop through which the water circulates.

When a given ice crystal grows to such a size that its buoyancy floats it up to the level of neck 10, it will quickly rise from there to the surface of the water, because its terminal velocity now greatly exceeds the reduced stream velocity found in flared top portion 2c of incubator 2. Ice crystals 12 which thus rise above neck 10 are closely matched in size. These ice crystals accumulate at mount 13 at the top of incubation duct 2, and may be harvested from there at any time without disturbing the operation of the device.

This natural mechanism for ejecting crystals when they reach maturity will have the effect of depopulating the crystal cloud. It is possible to make the device self-regulating by balancing this depopulating mechanism with a matching repopulating mechanism. This may be accomplished by exploiting the fact that over time there will be a slight variation in the temperature of the supercooled water that emerges from water chiller 3 and enters flared end 2c of incubation duct 2 at inlet 8, depending upon the presence and extent of the crystal cloud within the incubation duct. If no cloud is present, the lowest possible temperature is realized. With the cloud present, the water entering the water chiller at inlet 5 will be at a higher temperature due to the input of the heat of crystallization in the manner already described above. As a result, the output temperature will also be slightly elevated. The temperature of the water entering and leaving water chiller 3 will thus be highest when the cloud of tiny ice crystals has its largest size.

The device becomes self-regulating if we select an operating temperature such that the rate of spontaneous seed crystal generation in the presence of a seed crystal cloud comprised of a large number of crystals is slightly less than the rate at which the crystal cloud is depopulating through the rise of the largest crystals above neck 10 of incubation duct 2. This will result in the number of crystals in the crystal cloud shrinking. As the number of crystals in the cloud shrinks, the input of the heat of crystallization will also decrease. This, of course, will result in a slight drop in the temperature of the supercooled feed water at incubation duct inlet 8, which will in turn increase the rate of spontaneous seed crystal generation.

Another related mechanism exploits the fact that homogeneous crystallization has a large random component which obeys the laws of probability. Thus, a partial depopulation of the narrow end of the incubation duct just below neck 10 will mean that it takes longer to raise the temperature of the supercooled water stream to a level at which further crystallization is impossible.

In this expanded interval, a crystallization event becomes more probable.

Eventually then, as the crystal cloud depopulates, the rate of the spontaneous seed crystal generation will come to equal the rate of depopulation, and the apparatus will be able to operate on a sustained basis without need for further adjustment. When ice crystals 12 are removed from the floating accumulation of crystals at incubation duct mount 14, make-up water may be added at any suitable point in the system. In the embodiment shown in FIG. 1, make-up water is added to the pipe running between incubation duct drain outlet 4 and circulation pump 1, by introduction from source of make-up water 14 through valve 15.

Multi-Stage Ice Crystallizer With Salt Crystallization Feature

An alternative method for repopulating the seed cloud would be to introduce seeds or small pieces of ice from an external source. For example, several incubation ducts might be used such that the first duct generates and grows very small ice crystals, while the other ducts would have their water flow rates and depth of supercooling adjusted for growing increasingly larger crystals from the crystals that originated in the first duct.

A convenient method for effecting the transfer of crystals is to stack the incubation ducts vertically so that the flared top of a given one of the seed-forming incubation ducts communicates with the open base of the next duct above the given duct. Thus the crystals emerging from one incubation duct will float upward into the next duct.

Figure 2:
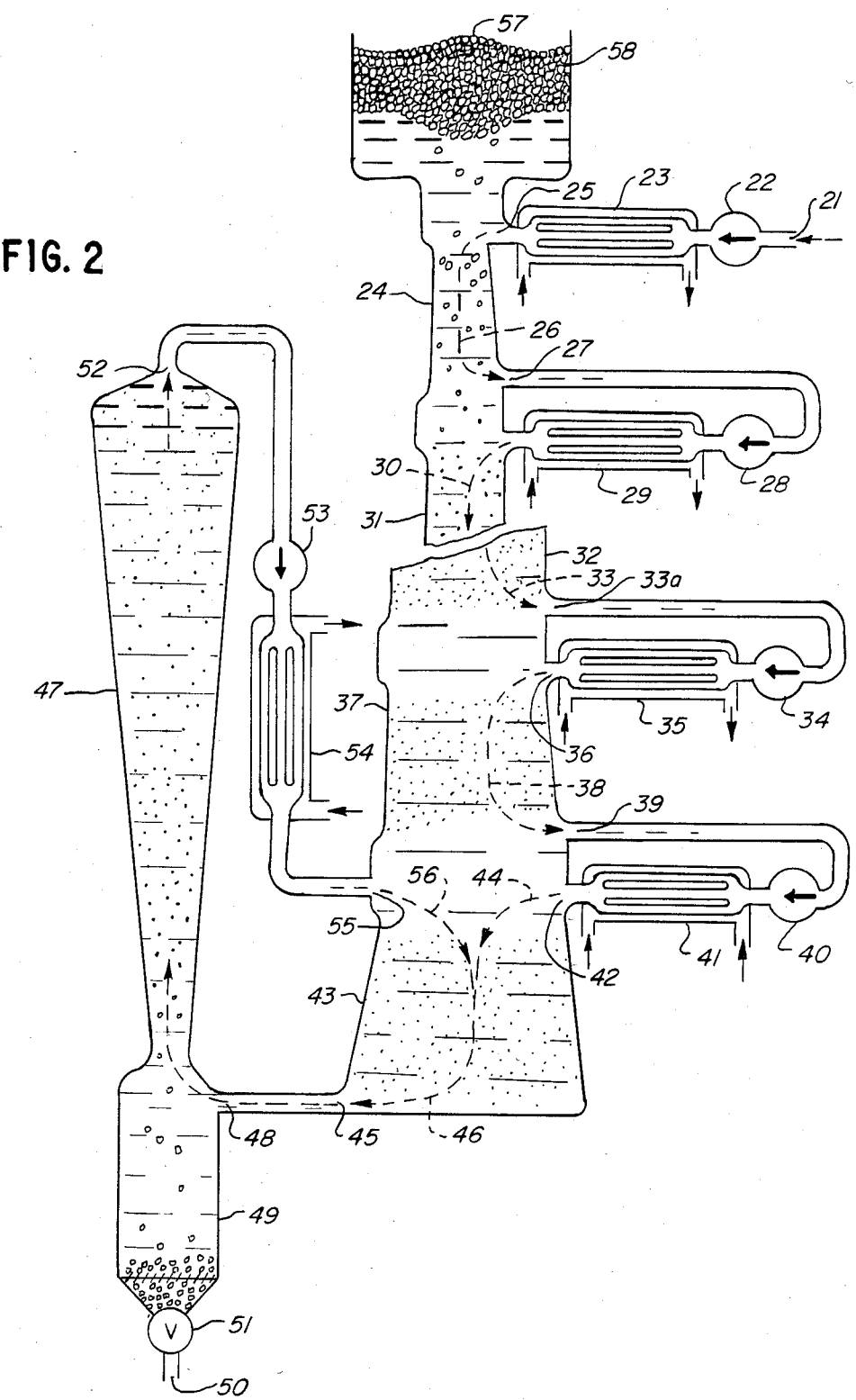
FIG. 2 is a cross-sectional view of a multistage device in accordance with the invention, which includes a salt crystallization feature as well as ice crystallization.

FIG. 2 illustrates such a multistage device, as well as a second feature involving salt crystallization that will also be described below. In this device, the feed water is an aqueous salt solution that is progressively chilled and crystallized, thereby increasing the salt concentration until a saturated (eutectic) mixture of salt and water is formed. At this point further crystallization generates both ice and salt crystals.

The path of the salt solution through the apparatus begins as inlet 21, where the feed water enters meter pump 22, and passes on to water chiller 23 (which is similar to water chiller 3 in FIG. 1). The supercooled brine exits chiller 23, and enters the top stage incubation duct 24 at inlet 25. From there it passes downward, following generally the path indicated by broken arrow 26. As the brine passes downward through the rising cloud of ice crystals, the temperature of the brine increases due to the release of heat of crystallization, until the brine reaches the bottom of top stage incubation duct 24, and passes into drain outlet 27 for that duct.

The brine that enters duct drain outlet 27 is pumped by a second meter pump 28, and chilled by a second water chiller 29, before continuing its downward journey, generally along the path indicated by broken arrow 30, into the next lower incubation duct 31.

Since the concentration of salt in the brine at drain outlet 27 is greater than at inlet 21, it follows that the freezing point will be depressed and the temperature of the second water chiller 29 will have to be somewhat lower than the first water chiller 23, in order to realize an adequate degree of supercooling.

Likewise, the rate at which brine is drawn from drain outlet 27 by second meter pump 28 is less than the rate of flow established by first meter pump 2b, by an amount exactly equal to the amount of water removed from the stream due to water that crystallizes onto the rising ice pieces that move up through, and finally out of, incubation duct 24. Any departure from this pump rate in second pump 28 will result in unwanted solution and temperature mixing.

As the brine continues downward, it will pass through a series of drain outlets, meter pumps, water chillers, and incubation ducts similar to pump 28, chiller 29 and duct 31 just described, until it reaches the bottom incubation stage in the series. Thus, in the embodiment illustrated in FIG. 2, after the brine leaves incubation duct 31 and passes through any intervening stages, it will pass through and out of incubation duct 32, moving generally along path 33 through drain outlet 33a, meter pump 34, water chiller 35, and incubation duct 36 into the next lower incubation duct 37, where it generally follows path 38. Similarly, the brine passes through drain outlet 39, meter pump 40, water chiller 41, and incubation duct inlet 42 into the lowest incubation duct 43, where it generally follows path 44.

The appropriate chiller temperatures and pump rates for the third stage from the top and all subsequent stages are determined sequentially based on the corresponding figures for the immediately preceding duct stage in the same manner as has been outlined above for top stage 24 and next-to-the-top stage 31.

FIG. 2 shows only the two top and the two bottom stages of the multistage device being described. In fact, maximum thermodynamic efficiency is realized by having as many stages as possible, since this better approximates a reversible process. The additional stages are suggested in FIG. 2 by the lines separating the two top from the two bottom stages that are shown.

As the brine passes through each of the upper stage incubation ducts, the concentration of salt progressively increases and the temperature decreases in accord with the freezing point depression. As the brine enters bottom incubation stage 43, maximum thermodynamic efficiency is realized by having the salt concentration in the brine at this stage at the saturation point.

The brine flow rate established by the final meter pump 40 should be just sufficient tot make up for the water lost in the bottom incubation duct 43 as a result of ice crystallization followed by the movement of the resulting crystals up through, and finally out of, that incubation duct.

As mentioned above, the embodiment of FIG. 2 includes a second feature involving salt crystallization, which will now be described.

Brine entering bottom ice incubation duct 43 at inlet 42 will become supersaturated with salt as it loses water through crystallization. The supersaturated solution moves generally along path 46, then exits ice crystallization duct 43 at drain outlet 45, and enters salt crystallizing incubation duct 47 at inlet 48.

Since salt crystals are heavier than a like volume of saturated salt water solution, the salt crystals will exhibit a negative buoyancy and sink. Therefore the supersaturated salt water solution enters salt crystal incubation duct 47 at the bottom and flows upward through a falling could of salt crystals. The crystals that have grown sufficiently large to fall faster than the maximum upward velocity of the supersaturated stream at the narrowest section of the duct near the bottom, fall out of the incubation duct 47 into the crystal collector 49. From there they may be removed by any suitable means such as drain outlet 50 and valve 51.

After passing through the crystal cloud, the brine solution is no longer supersaturated, and is ready to exit the salt crystal incubation duct 47 at its top 52.

From there it passes on through circulation pump 53 and brine chiller 54. The now supercooled, salt saturated brine water re-enters bottom incubation duct 43 at inlet 55, to flow downward in duct 43 generally along path 56. The cycle of water crystallization followed by salt crystallization is then repeated.

The paths of the ice and salt crystals have their origins in the top of uppermost stage 24, and at the bottom of stage 47, respectively, where seed crystals are generated by mechanisms such as have been already described in discussing FIG. 1. The crystals are then swept around the ice and salt crystal incubation duct circuits, respectively, until they have grown sufficiently to assume stage positions in the last rank of the crystal clouds in their respective ducts.

The ice crystals in lowermost incubation duct 43 grow and float upward passing sequentially through incubation ducts 37, 32 any intervening ducts above stage 32, then incubation duct 31 and finally uppermost incubation duct 24, until they are large enough to escape that uppermost duct and gather in ice crystal accumulation 57 in ice crystal collector 58, where they are available for harvesting.

The above detailed description has been given for clearness of understanding only. No unnecessary limitations should be understood therefrom, as modifications will be obvious to those skilled in the art.

I claim:

1. An apparatus for producing buoyant, free-flowing product crystals from a downwardly flowing stream of a given feed liquid that has a specific gravity greater than the specific gravity of said crystals, and growing said product crystals to a size exhibiting a predetermined terminal buoyant velocity with respect to said downwardly flowing stream of said given liquid in which they are immersed, which apparatus comprises:
   (a) a hollow, vertically oriented incubation duct of varying cross section, said incubation duct (i) being open at its top end, (ii) being tapered inward from a point adjacent its bottom end to its smallest cross-sectional area at a neck portion near its top end, and (iii) having an upwardly extending portion at its top end above said neck;
   (b) means for supercooling a quantity of said given feed liquid, which liquid is suitable for nourishing the growth of said crystals;
   (c) means for introducing said supercooled feed liquid under pressure into said incubation duct above said duct neck portion, to fill said incubation duct and pass downward through said duct neck with an initial velocity substantially equal to and opposite from said predetermined terminal buoyant velocity of said free floating product crystals in said liquid; and
   (d) means for withdrawing said feed liquid from the bottom portion of said incubation duct for further supercooling.

2. The crystallizing apparatus of claim 1 in which the cross-sectional area of said incubation duct decreases, as one moves from the bottom of said duct to said smallest cross-sectional area near the top of the duct, as a monotonic function of the distance from said duct bottom.

3. The crystallizing apparatus of claim 2 in which the cross-sectional area of said incubation duct decreases substantially continuously as one moves from the bottom of said duct to said smallest cross-sectional area near the top of the duct.

4. The crystallizing apparatus of claim 3 in which the cross-sectional area of said incubation duct decreases at substantially a constant rate as one moves from the bottom of said duct to said smallest cross-sectional area near the top of the duct.

5. The crystallizing apparatus of claim 1 in which the bottom end of said incubation duct is closed, and which includes means for returning said withdrawn liquid to said supercooling means.

6. The crystallizing apparatus of claim 5 which includes means for introducing make-up feed liquid into said supercooling means in a quantity and at a rate substantially equivalent to the total quantity and rate of removal of free floating crystals that are removed from said incubation duct through said open end of the upwardly extending top end portion of said duct.

7. The crystallizing apparatus of claim 1 in which at least a part of said upwardly extending portion of said incubation duct that is located above said duct neck flares outward with increasing distance above said duct bottom end.

8. The crystallizing apparatus of claim 1 in which said supercooling means has an inlet and an outlet, and said inlet and outlet are connected by a plurality of separate channels through all of which channels said feed liquid passes as it is being supercooled.

9. The crystallizing apparatus of claim 1 in which the bottom end of the incubation duct there described is open, and which includes:
   (a) at least one hollow, vertically oriented incubation duct of varying cross-section in addition to said first mentioned incubation duct, said first mentioned incubation duct and said at least one additional incubation duct forming a series of vertically stacked incubation ducts,
   each of said additional incubation ducts (i) being open at its top end, (ii) being tapered inward from a point adjacent its top end, (ii) being tapered inward from a point adjacent its bottom end to its smallest cross-sectional area at a neck portion near its top end, and (iii) having an upwardly extending portion at its top end above said neck,
   said first mentioned incubation duct and each of said at least one additional incubation duct having a cross-sectional area at its said neck portion that is smaller than the cross-sectional area of the neck portion of the incubation duct located immediately below it in said stacked series of ducts,
   the bottom of said first mentioned incubation duct being open, the bottom of the lowermost one of said at least one additional incubation duct being closed, and the bottom of any other incubation ducts in said series of incubation ducts being open;
   (b) means for withdrawing separate quantities of said feed liquid from the bottom portion of said first mentioned incubation duct, and from the bottom portion of each of said at least one additional incubation duct located above the lowermost additional incubation duct;
   (c) means for separately supercooling each of said quantities of feed liquid thus withdrawn;
   (d) means for introducing each of said separate quantities of supercooled feed liquid into the one of said additional incubation ducts located immediately below the incubation duct from which the respective quantity of said feed liquid was withdrawn, said quantity of feed liquid being introduced above said neck portion of the respective additional incubation duct, and (e) means for withdrawing a quantity of said feed liquid for further cooling from the bottom portion of the lowermost one of said additional incubation ducts.

10. The crystallizing apparatus of claim 9 for producing, from a feed liquid comprising a given aqueous salt solution, both the aforementioned buoyant, free-floating product crystals from a downwardly flowing stream of said solution, and sinking salt crystals from an upwardly flowing stream of said solution, said salt crystals being grown to a size exhibiting a predetermined terminal sinking velocity with respect to said upwardly flowing stream of said solution in which they are immersed, which apparatus includes:

(a) a hollow, vertically oriented incubation duct of varying cross-section, said incubation duct (i) being tapered upward and outward from its smallest cross-sectional area located at a neck portion near its bottom end, (ii) being closed at its top end, (iii) having a downwardly extending portion at its bottom end below said neck portion, and (iv) being closed at the bottom end of said downwardly extending portion;

(b) means for introducing said quantity of feed liquid withdrawn from said bottom portion of the lowermost one of said additional incubation ducts into the bottom portion of said last mentioned, upwardly and outwardly tapered incubation duct below said neck portion thereof, to fill said last mentioned incubation duct and pass upward through said duct neck with an initial velocity substantially equal to and opposite from said predetermined terminal sinking velocity of crystals of the solute in said salt solution;

(c) means for withdrawing a quantity of feed liquid from the top portion of said last mentioned incubation duct;

(d) means for further supercooling of said last mentioned withdrawn quantity of feed liquid;

(e) means for introducing said last mentioned quantity of withdrawn feed liquid into said further supercooling means; and (f) means for introducing said further supercooled feed liquid, after removal from said further supercooling means, into the lowermost of said additional incubation ducts at the top end thereof, whereby ice crystals substantially of a first predetermined size gather at the open top end of said first mentioned incubation duct, and crystals of the solute of said salt solution of approximately a second predetermined size gather at the bottom end of said last mentioned, upwardly and outwardly tapered, incubation duct.

11. The crystallizing apparatus of claim 10 which includes means located at the bottom end of said last mentioned incubation duct for removal of said salt crystals of approximately said second predetermined size.

* * * * *